US012585606B2

(12) United States Patent
Anderson

(10) Patent No.: US 12,585,606 B2
(45) Date of Patent: Mar. 24, 2026

(54) CONTROL MECHANISM FOR USE WITH A MOBILE DEVICE DOCK AND SYSTEMS AND METHODS INCLUDING THE CONTROL MECHANISM

(71) Applicant: National Products, Inc., Seattle, WA (US)

(72) Inventor: Scott Anderson, Seattle, WA (US)

(73) Assignee: National Products, Inc., Seattle, WA (US)

( * ) Notice: Subject to any disclaimer, the term of this patent is extended or adjusted under 35 U.S.C. 154(b) by 142 days.

(21) Appl. No.: 18/204,889

(22) Filed: Jun. 1, 2023

(65) Prior Publication Data

US 2024/0403251 A1    Dec. 5, 2024

(51) Int. Cl.
*G06F 13/00*        (2006.01)
*G06F 1/16*         (2006.01)
*G06F 13/40*        (2006.01)

(52) U.S. Cl.
CPC ........ *G06F 13/4068* (2013.01); *G06F 1/1632* (2013.01)

(58) Field of Classification Search
None
See application file for complete search history.

(56) References Cited

U.S. PATENT DOCUMENTS

| | | |
|---|---|---|
| 809,977 A | 1/1906 | O'Brien |
| 1,786,459 A | 12/1930 | Simons |
| 2,495,552 A | 1/1950 | Schmitz |
| 2,549,917 A | 4/1951 | Millbrandt |
| 2,565,939 A | 8/1951 | Wriston |
| 2,612,947 A | 10/1952 | Jenks |
| 2,717,093 A | 9/1955 | Mautner |
| 2,803,368 A | 8/1957 | Koch |
| 3,018,525 A | 1/1962 | Deisenroth |

(Continued)

FOREIGN PATENT DOCUMENTS

| | | |
|---|---|---|
| CN | 1312603 | 9/2001 |
| CN | 101674096 | 3/2010 |

(Continued)

OTHER PUBLICATIONS www.wikipedia.org, Relay, 2006 (Year: 2006).*

(Continued)

*Primary Examiner* — Henry Tsai
*Assistant Examiner* — Dean Phan
(74) *Attorney, Agent, or Firm* — Branch Partners PLLC; Bruce E. Black

(57) ABSTRACT

A control system for a vehicle, device, or asset includes a dock for a mobile device; and a control mechanism coupled, or coupleable to, the dock and including a power input, a dock input, and a first output, wherein the control mechanism defines an second switch position and a first switch position, wherein the switching mechanism is in the first switch position when a power source is coupled to the power input and an enablement signal is received from the dock via the dock input, otherwise the switching mechanism is in the second switch position, wherein the first output is coupleable to the vehicle, device, or asset to allow operation of the vehicle, device, or asset only when the switching mechanism is in the first switch position.

20 Claims, 5 Drawing Sheets

(56)  References Cited

U.S. PATENT DOCUMENTS

| | | | |
|---|---|---|---|
| 3,140,883 A | 7/1964 | Anthony | |
| 3,464,579 A | 9/1969 | Asenbauer | |
| 3,667,648 A | 6/1972 | Koziol | |
| 3,885,701 A | 5/1975 | Becklin | |
| 3,972,459 A | 8/1976 | Cooper | |
| 3,978,830 A | 9/1976 | Toth, Jr. | |
| 4,298,204 A | 11/1981 | Jinkins | |
| 4,564,880 A | 1/1986 | Christ et al. | |
| 4,607,772 A | 8/1986 | Hancock | |
| 4,828,558 A | 5/1989 | Kelman | |
| 4,842,174 A | 6/1989 | Sheppard et al. | |
| 4,848,319 A | 7/1989 | Appeldorn | |
| 5,002,184 A | 3/1991 | Lloyd | |
| 5,052,943 A | 10/1991 | Davis | |
| 5,096,317 A | 3/1992 | Phillippe | |
| 5,135,189 A | 8/1992 | Ghazizadeh | |
| 5,246,133 A | 9/1993 | James | |
| 5,272,771 A | 12/1993 | Ansell et al. | |
| 5,295,602 A | 3/1994 | Swanson | |
| 5,353,934 A | 10/1994 | Yamauchi | |
| 5,388,692 A | 2/1995 | Withrow et al. | |
| 5,457,745 A | 10/1995 | Wang | |
| 5,535,274 A | 7/1996 | Braitberg et al. | |
| 5,584,054 A | 12/1996 | Tyneski et al. | |
| 5,586,002 A | 12/1996 | Notarianni | |
| 5,641,065 A | 6/1997 | Owens et al. | |
| 5,646,649 A | 7/1997 | Iwata et al. | |
| 5,708,707 A | 1/1998 | Halttunen et al. | |
| 5,791,506 A | 8/1998 | Sheffler et al. | |
| 5,813,096 A | 9/1998 | Soennichsen | |
| 5,822,427 A | 10/1998 | Braitberg et al. | |
| 5,842,670 A | 12/1998 | Nigoghosian | |
| 5,845,885 A | 12/1998 | Carnevali | |
| 5,860,550 A | 1/1999 | Miller et al. | |
| 5,888,087 A | 3/1999 | Hanson et al. | |
| 5,895,018 A | 4/1999 | Rielo | |
| 5,953,795 A | 9/1999 | Bauer | |
| 5,969,057 A | 10/1999 | Schoeley et al. | |
| 5,990,874 A | 11/1999 | Tsumura et al. | |
| 5,992,807 A | 11/1999 | Tarulli | |
| 6,009,601 A | 1/2000 | Kaufman | |
| 6,010,005 A | 1/2000 | Reames et al. | |
| 6,032,910 A | 3/2000 | Richter | |
| 6,034,505 A | 3/2000 | Arthur et al. | |
| 6,035,800 A | 3/2000 | Clifford | |
| 6,043,626 A | 3/2000 | Snyder et al. | |
| 6,068,119 A | 5/2000 | Derr et al. | |
| 6,149,116 A | 11/2000 | Won | |
| 6,191,943 B1 | 2/2001 | Tracy | |
| D439,218 S | 3/2001 | Yu | |
| 6,229,893 B1 | 5/2001 | Chen | |
| 6,273,773 B1 | 8/2001 | Bourke | |
| 6,276,552 B1 | 8/2001 | Vervisch | |
| 6,295,198 B1 | 9/2001 | Loh et al. | |
| 6,317,313 B1 | 11/2001 | Mosgrove et al. | |
| 6,341,218 B1 | 1/2002 | Poplawsky et al. | |
| 6,356,053 B1 | 3/2002 | Sandoz et al. | |
| 6,377,825 B1 | 4/2002 | Kennedy et al. | |
| 6,392,882 B1 | 5/2002 | Chen et al. | |
| 6,406,758 B1 | 6/2002 | Bottari et al. | |
| 6,407,860 B1 | 6/2002 | Funazaki et al. | |
| 6,425,040 B1 * | 7/2002 | Dewa | G06F 1/3203 |
| | | | 713/300 |
| 6,438,229 B1 | 8/2002 | Overy et al. | |
| 6,561,476 B2 | 5/2003 | Carnevali | |
| 6,572,176 B2 | 6/2003 | Davies et al. | |
| 6,585,212 B2 | 7/2003 | Carnevali | |
| 6,588,637 B2 | 7/2003 | Gates et al. | |
| 6,597,924 B1 | 7/2003 | Smith | |
| 6,614,423 B1 | 9/2003 | Wong et al. | |
| 6,646,864 B2 | 11/2003 | Richardson | |
| 6,648,376 B2 | 11/2003 | Christianson | |
| 6,687,516 B2 | 2/2004 | Chen | |
| 6,702,604 B1 | 3/2004 | Moscovitch | |
| 6,714,802 B1 | 3/2004 | Barvesten | |
| 6,754,343 B2 | 6/2004 | Lundstrom et al. | |
| 6,762,585 B2 | 7/2004 | Liao | |
| 6,776,422 B1 | 8/2004 | Toy | |
| 6,785,566 B1 | 8/2004 | Irizarry | |
| 6,785,567 B2 | 8/2004 | Kato | |
| 6,816,713 B2 | 11/2004 | Chen | |
| 6,842,171 B2 | 1/2005 | Richter et al. | |
| 6,953,126 B2 | 10/2005 | Parker et al. | |
| 6,984,680 B2 | 1/2006 | Quinn | |
| 6,995,976 B2 | 2/2006 | Richardson | |
| 7,017,243 B2 | 3/2006 | Carnevali | |
| 7,031,148 B1 | 4/2006 | Lin | |
| 7,054,042 B2 | 5/2006 | Holmes et al. | |
| 7,068,783 B2 | 6/2006 | Peiker | |
| 7,158,376 B2 | 1/2007 | Richardson et al. | |
| 7,180,735 B2 | 2/2007 | Thomas et al. | |
| 7,203,058 B2 | 4/2007 | Hong | |
| 7,230,823 B2 | 6/2007 | Richardson et al. | |
| 7,236,356 B2 | 6/2007 | Ulla et al. | |
| 7,248,901 B2 | 7/2007 | Peiker | |
| 7,257,429 B2 | 8/2007 | Kogan | |
| 7,283,849 B2 | 10/2007 | Peiker | |
| 7,311,526 B2 | 12/2007 | Rohrbach et al. | |
| 7,312,984 B2 | 12/2007 | Richardson et al. | |
| 7,320,450 B2 | 1/2008 | Carnevali | |
| 7,329,128 B1 | 2/2008 | Awad | |
| 7,351,066 B2 | 4/2008 | DiFonzo et al. | |
| 7,430,674 B2 | 9/2008 | von Mueller et al. | |
| 7,464,814 B2 | 12/2008 | Carnevali | |
| 7,480,138 B2 | 1/2009 | Kogan et al. | |
| 7,481,664 B1 | 1/2009 | Knoll et al. | |
| 7,517,222 B2 | 4/2009 | Rohrbach et al. | |
| 7,520,389 B2 | 4/2009 | Lalouette | |
| 7,551,458 B2 | 6/2009 | Carnevali | |
| 7,566,224 B2 | 7/2009 | Wu | |
| 7,573,706 B2 | 8/2009 | Carnevali | |
| 7,594,576 B2 | 9/2009 | Chen et al. | |
| 7,609,512 B2 | 10/2009 | Richardson et al. | |
| 7,612,997 B1 | 11/2009 | Diebel et al. | |
| 7,625,212 B2 | 12/2009 | Du | |
| 7,641,477 B2 | 1/2010 | DiFonzo et al. | |
| 7,645,143 B2 | 1/2010 | Rohrbach et al. | |
| 7,663,879 B2 | 2/2010 | Richardson et al. | |
| 7,688,580 B2 | 3/2010 | Richardson et al. | |
| 7,775,801 B2 | 8/2010 | Shiff et al. | |
| 7,782,610 B2 | 8/2010 | Diebel et al. | |
| 7,812,567 B2 | 10/2010 | Shen | |
| 7,841,776 B2 | 11/2010 | DiFonzo et al. | |
| 7,850,032 B2 | 12/2010 | Carnevali et al. | |
| 7,855,529 B2 | 12/2010 | Liu | |
| RE42,060 E | 1/2011 | Carnevali | |
| 7,889,489 B2 | 2/2011 | Richardson et al. | |
| 7,889,498 B2 | 2/2011 | Diebel et al. | |
| 7,894,180 B2 | 2/2011 | Carnevali | |
| 7,894,861 B2 * | 2/2011 | Grivas | B60R 25/33 |
| | | | 455/575.9 |
| 7,901,216 B2 | 3/2011 | Rohrbach et al. | |
| 7,907,394 B2 | 3/2011 | Richardson et al. | |
| 7,911,779 B1 | 3/2011 | Tarnoff | |
| 7,946,868 B1 | 5/2011 | Chen | |
| 7,946,891 B2 | 5/2011 | Peiker | |
| 7,970,440 B2 | 6/2011 | Bury | |
| RE42,581 E | 8/2011 | Carnevali | |
| 7,997,554 B2 | 8/2011 | Carnevali | |
| 8,054,042 B2 | 11/2011 | Griffin., Jr. et al. | |
| 8,061,516 B2 | 11/2011 | Carnevali | |
| 8,062,078 B2 | 11/2011 | Asai et al. | |
| 8,074,951 B2 | 12/2011 | Carnevali | |
| 8,080,975 B2 | 12/2011 | Bessa et al. | |
| 8,087,939 B2 | 1/2012 | Rohrbach et al. | |
| 8,099,138 B2 | 1/2012 | Piekarz | |
| 8,167,624 B2 | 5/2012 | Hartlef et al. | |
| 8,172,580 B1 | 5/2012 | Chen et al. | |
| 8,177,178 B2 | 5/2012 | Carnevaali | |
| 8,177,560 B2 | 5/2012 | Rohrbach et al. | |
| 8,179,672 B2 | 5/2012 | Carnevali | |
| 8,183,825 B2 | 5/2012 | Sa | |
| 8,224,408 B2 | 7/2012 | Tomasini et al. | |
| 8,295,043 B2 | 10/2012 | Tai et al. | |

(56)  References Cited

U.S. PATENT DOCUMENTS

| | | | |
|---|---|---|---|
| RE43,806 E | 11/2012 | Carnevali |
| 8,367,235 B2 | 2/2013 | Huang |
| 8,390,255 B1 | 3/2013 | Fathollahi |
| 8,405,974 B2 | 3/2013 | Sayavong |
| 8,414,312 B2 | 4/2013 | Hung et al. |
| 8,430,240 B2 | 4/2013 | Kim |
| 8,435,042 B2 | 5/2013 | Rohrbach et al. |
| 8,453,835 B2 | 6/2013 | So |
| 8,454,178 B2 | 6/2013 | Carnevali |
| 8,457,701 B2 | 6/2013 | Diebel |
| 8,483,758 B2 | 7/2013 | Huang |
| 8,497,753 B2 | 7/2013 | DiFonzo et al. |
| 8,505,861 B2 | 8/2013 | Carnevali |
| 8,531,833 B2 | 9/2013 | Diebel et al. |
| 8,553,408 B2 | 10/2013 | Supran et al. |
| 8,560,014 B1 | 10/2013 | Hu et al. |
| 8,634,887 B2 | 1/2014 | Hu et al. |
| 8,639,288 B1 | 1/2014 | Friedman |
| 8,646,698 B2 | 2/2014 | Chen et al. |
| 8,675,359 B2 | 3/2014 | Chen |
| 8,690,582 B2 | 4/2014 | Rohrbach et al. |
| 8,702,316 B2 | 4/2014 | DiFonzo et al. |
| 8,729,854 B2 | 5/2014 | Tsai et al. |
| 8,760,311 B2 | 6/2014 | Heaton |
| 8,763,802 B2 | 7/2014 | Ellis-Brown |
| 8,801,441 B2 | 8/2014 | Zhang et al. |
| 8,825,123 B1 | 9/2014 | Gudino |
| 8,833,716 B2 | 9/2014 | Funk et al. |
| 8,873,233 B2 | 10/2014 | Reber et al. |
| D718,293 S | 11/2014 | Namminga |
| 8,891,800 B1 | 11/2014 | Shaffer |
| 8,894,420 B2 | 11/2014 | Schichl et al. |
| 8,907,783 B2 | 12/2014 | Fish et al. |
| 8,911,246 B2 | 12/2014 | Carnevali |
| 8,917,506 B2 | 12/2014 | Diebel et al. |
| 8,929,065 B2 | 1/2015 | Williams |
| 8,950,717 B2 | 2/2015 | Chuang |
| 8,970,332 B2 | 3/2015 | DiFonzo et al. |
| 9,011,184 B2 | 4/2015 | Chen et al. |
| 9,026,187 B2 | 5/2015 | Huang |
| 9,036,343 B2 | 5/2015 | Carnevali |
| 9,071,060 B2 | 6/2015 | Fathollahi |
| 9,072,172 B2 | 6/2015 | Hsu |
| 9,112,304 B2 | 8/2015 | Rohrbach et al. |
| 9,123,935 B2 | 9/2015 | Huang |
| 9,147,966 B2 | 9/2015 | An |
| 9,172,781 B1 | 10/2015 | Goldstein |
| 9,195,279 B2 | 11/2015 | Carnevali et al. |
| 9,201,593 B2 | 12/2015 | Collopy et al. |
| 9,288,295 B2 | 3/2016 | Ivanovski et al. |
| 9,298,661 B2 | 3/2016 | Hamel et al. |
| 9,300,078 B2 | 3/2016 | Liu et al. |
| 9,300,081 B2 | 3/2016 | Rudisill et al. |
| 9,331,444 B2 | 5/2016 | Carnevali |
| 9,356,267 B1 | 5/2016 | To et al. |
| 9,495,375 B2 | 11/2016 | Huang et al. |
| 9,529,387 B2 | 12/2016 | Carnevali |
| 9,535,457 B1 | 1/2017 | Vier |
| 9,567,776 B2 | 2/2017 | Moock et al. |
| 9,591,113 B2 | 3/2017 | Filser et al. |
| 9,602,639 B2 | 3/2017 | Carnevali |
| 9,632,535 B2 | 4/2017 | Carnevali et al. |
| 9,647,474 B2 | 5/2017 | Fathollahi et al. |
| 9,706,026 B2 | 7/2017 | Carnevali |
| 9,742,885 B2 | 8/2017 | Rostami |
| 9,748,535 B2 | 8/2017 | Huang et al. |
| 9,760,116 B2 | 9/2017 | Wylie |
| 9,762,013 B2 | 9/2017 | George et al. |
| 9,774,713 B2 | 9/2017 | Guerdrum et al. |
| 9,776,577 B2 | 10/2017 | Carnevali |
| 9,807,211 B2 | 10/2017 | Guerdrum et al. |
| 9,809,175 B2 | 11/2017 | Jonik et al. |
| 9,817,441 B1 | 11/2017 | Kuo |
| 9,831,904 B1 | 11/2017 | Carnevali |
| 9,898,041 B2 | 2/2018 | Blowers et al. |
| 9,924,005 B1 | 3/2018 | McElderry |
| 10,033,204 B2 | 7/2018 | Huang et al. |
| 10,050,658 B2 | 8/2018 | Carnevali |
| 10,054,984 B2 | 8/2018 | Carnevali et al. |
| 10,148,104 B2 | 12/2018 | Sa |
| 10,170,738 B2 | 1/2019 | Huang et al. |
| 10,172,246 B2 | 1/2019 | Apter |
| 10,330,251 B2 | 6/2019 | Carnevali |
| 10,389,399 B2 | 8/2019 | Carnevali |
| 10,401,905 B2 | 9/2019 | Carnevali |
| 10,416,715 B1 | 9/2019 | Wade et al. |
| 10,454,515 B2 | 10/2019 | Carnevali |
| 10,485,312 B2 | 11/2019 | Rodriguez |
| 10,516,431 B2 | 12/2019 | DiLella |
| 10,559,788 B2 | 2/2020 | Huang et al. |
| 10,630,334 B2 | 4/2020 | Carnevali |
| 10,656,687 B2 | 5/2020 | Tashiro et al. |
| 10,666,309 B2 | 5/2020 | Carnevali |
| 10,707,632 B1 | 7/2020 | Yamamoto et al. |
| 10,714,953 B1 | 7/2020 | Solana et al. |
| 10,778,275 B2 | 9/2020 | Carnevali |
| 10,788,857 B2 | 9/2020 | Huang et al. |
| 10,812,643 B1 | 10/2020 | Carnevali et al. |
| D903,685 S | 12/2020 | Wright et al. |
| 10,928,856 B1 | 2/2021 | Hamlin et al. |
| D915,373 S | 4/2021 | Zhou |
| 10,976,777 B2 | 4/2021 | Pischel |
| 11,029,731 B1 | 6/2021 | Carnevali |
| D924,863 S | 7/2021 | Wright et al. |
| 11,076,032 B1 | 7/2021 | Carnevali |
| 11,165,458 B2 | 11/2021 | Carnevali |
| 11,277,506 B2 | 3/2022 | Carnevali |
| 11,289,864 B2 | 3/2022 | Carnevali et al. |
| 11,489,350 B2 | 11/2022 | Carnevali |
| 11,522,379 B2 | 12/2022 | Lee et al. |
| 11,597,334 B2 | 3/2023 | Telesco et al. |
| 11,619,971 B1 | 4/2023 | Passe et al. |
| 11,622,032 B2 | 4/2023 | Wright et al. |
| 11,652,326 B2 | 5/2023 | Carnevali |
| 12,132,511 B2 | 10/2024 | Carnevali |
| D1,052,884 S | 12/2024 | Hong |
| 2002/0009194 A1 | 1/2002 | Wong et al. |
| 2002/0032041 A1 | 3/2002 | Hirai et al. |
| 2002/0136557 A1 | 9/2002 | Shimamura |
| 2002/0191782 A1 | 12/2002 | Beger et al. |
| 2002/0193136 A1 | 12/2002 | Halkosaari et al. |
| 2003/0068986 A1 | 4/2003 | Oh |
| 2003/0116631 A1 | 6/2003 | Salvato et al. |
| 2003/0218445 A1 | 11/2003 | Behar |
| 2004/0108348 A1 | 6/2004 | Barnes |
| 2004/0209489 A1 | 10/2004 | Clapper |
| 2005/0189354 A1 | 9/2005 | Heather et al. |
| 2006/0058073 A1 | 3/2006 | Kim |
| 2006/0175766 A1 | 8/2006 | Carnevali |
| 2007/0127204 A1 | 6/2007 | Muenzer et al. |
| 2007/0261978 A1 | 11/2007 | Sanderson |
| 2008/0053770 A1 | 3/2008 | Tynyk |
| 2008/0104301 A1 | 5/2008 | Assouad et al. |
| 2008/0149796 A1 | 6/2008 | Moscovitch |
| 2008/0273734 A1 | 11/2008 | Solland |
| 2009/0021903 A1 | 1/2009 | Chen et al. |
| 2009/0140113 A1 | 6/2009 | Carnevali |
| 2009/0160400 A1 | 6/2009 | Woud |
| 2009/0314400 A1 | 12/2009 | Liu |
| 2010/0013431 A1 | 1/2010 | Liu |
| 2011/0122565 A1 | 5/2011 | Liu |
| 2011/0134601 A1 | 6/2011 | Sa |
| 2011/0143583 A1 | 6/2011 | Zilmer et al. |
| 2011/0159324 A1 | 6/2011 | Huang et al. |
| 2011/0299238 A1 | 12/2011 | Radin et al. |
| 2012/0018325 A1 | 1/2012 | Kim |
| 2012/0043235 A1 | 2/2012 | Klement |
| 2012/0047292 A1* | 2/2012 | Tamura ................ G06F 1/266 710/17 |
| 2012/0088558 A1 | 4/2012 | Song |
| 2012/0118773 A1 | 5/2012 | Rayner |
| 2012/0161706 A1 | 6/2012 | Zhou |
| 2012/0211382 A1 | 8/2012 | Rayner |
| 2012/0250270 A1 | 10/2012 | Liu |

(56) References Cited

U.S. PATENT DOCUMENTS

| | | |
|---|---|---|
| 2012/0261306 A1 | 10/2012 | Richardson et al. |
| 2012/0298536 A1 | 11/2012 | Rauta et al. |
| 2012/0303520 A1 | 11/2012 | Huang |
| 2013/0023313 A1 | 1/2013 | Kim |
| 2013/0088188 A1 | 4/2013 | Romanenko |
| 2013/0092576 A1 | 4/2013 | Rayner |
| 2013/0106353 A1 | 5/2013 | Foster |
| 2013/0193006 A1 | 8/2013 | Bergreen et al. |
| 2013/0220841 A1 | 8/2013 | Yang |
| 2013/0222991 A1 | 8/2013 | McWilliams |
| 2013/0258573 A1 | 10/2013 | Muday et al. |
| 2013/0273752 A1 | 10/2013 | Rudisill et al. |
| 2013/0273983 A1 | 10/2013 | Hsu |
| 2013/0300267 A1 | 11/2013 | Richardson et al. |
| 2013/0322568 A1 | 12/2013 | Pais et al. |
| 2013/0331156 A1 | 12/2013 | Lui |
| 2013/0334071 A1 | 12/2013 | Carnevali |
| 2014/0035511 A1 | 2/2014 | Ferber et al. |
| 2014/0036420 A1 | 2/2014 | Chen |
| 2014/0042285 A1 | 2/2014 | Carnevali |
| 2014/0055928 A1 | 2/2014 | Lee |
| 2014/0059264 A1 | 2/2014 | Sudak |
| 2014/0065948 A1 | 3/2014 | Huang |
| 2014/0066144 A1 | 3/2014 | Hong |
| 2014/0070774 A1 | 3/2014 | Terlizzi et al. |
| 2014/0099526 A1 | 4/2014 | Powell et al. |
| 2014/0168885 A1 | 6/2014 | Williams |
| 2014/0307376 A1 | 10/2014 | Lee |
| 2014/0347000 A1 | 11/2014 | Hamann et al. |
| 2014/0363988 A1 | 12/2014 | An |
| 2015/0055289 A1 | 2/2015 | Chang et al. |
| 2015/0146401 A1 | 5/2015 | Su et al. |
| 2015/0189780 A1 | 7/2015 | Su et al. |
| 2015/0270861 A1 | 9/2015 | Lin et al. |
| 2016/0065702 A1 | 3/2016 | Carnevali |
| 2016/0231779 A1 | 8/2016 | Kaneko et al. |
| 2016/0309010 A1 | 10/2016 | Carnevali |
| 2017/0054312 A1 | 2/2017 | Kuchynka et al. |
| 2017/0185462 A1* | 6/2017 | Cox .................... G06F 13/4081 |
| 2017/0227987 A1 | 8/2017 | Carnevali et al. |
| 2018/0279809 A1 | 10/2018 | Regan et al. |
| 2018/0314296 A1 | 11/2018 | Evns, V et al. |
| 2019/0267825 A1 | 8/2019 | Chien |
| 2019/0278724 A1* | 9/2019 | Lin ..................... G06F 13/4081 |
| 2020/0148169 A1* | 5/2020 | Yi ..................... H04M 1/72412 |
| 2020/0195763 A1 | 6/2020 | Ellis |
| 2020/0197563 A1 | 6/2020 | Shen et al. |
| 2020/0326955 A1 | 10/2020 | Adiletta et al. |
| 2020/0330037 A1 | 10/2020 | Al-Ali et al. |
| 2020/0371555 A1 | 11/2020 | Huang et al. |
| 2021/0048848 A1 | 2/2021 | Pischel |
| 2021/0194256 A1 | 6/2021 | Carnevali |
| 2021/0391678 A1 | 12/2021 | Carnevali |
| 2021/0392773 A1 | 12/2021 | Carnevali |
| 2022/0026951 A1 | 1/2022 | Wood, III et al. |
| 2022/0066505 A1 | 3/2022 | Lu et al. |
| 2022/0253097 A1 | 8/2022 | Carnevali et al. |
| 2022/0352682 A1 | 11/2022 | Carnevali |
| 2023/0039167 A1 | 2/2023 | Kamepalli et al. |
| 2023/0045485 A1 | 2/2023 | Carnevali et al. |
| 2023/0341897 A1 | 10/2023 | Carnevali et al. |
| 2024/0399976 A1 | 12/2024 | Carnevali et al. |
| 2024/0403251 A1 | 12/2024 | Anderson |
| 2025/0224768 A1 | 7/2025 | Carnevali |
| 2025/0226846 A1 | 7/2025 | Carnevali |

FOREIGN PATENT DOCUMENTS

| | | |
|---|---|---|
| CN | 202268924 | 6/2012 |
| CN | 202565335 | 11/2012 |
| CN | 204334055 | 5/2015 |
| CN | 204334674 | 5/2015 |
| CN | 204408423 | 6/2015 |
| JP | 2004-349969 | 12/2004 |
| JP | 2014-75327 | 4/2014 |
| KR | 20-0265673 | 2/2002 |
| KR | 10-1078214 | 11/2011 |
| KR | 101609754 B1 | 4/2016 |
| TW | 2003TW531119 | 5/2003 |
| TW | M422808 | 2/2012 |
| WO | 2012/052751 | 4/2012 |
| WO | 2013/081222 | 6/2013 |
| WO | 2014/010781 A1 | 1/2014 |
| WO | 2014/054426 | 4/2014 |
| WO | 2015/022675 | 2/2015 |

OTHER PUBLICATIONS

U.S. Appl. No. 18/590,837, filed Feb. 28, 2024.
U.S. Appl. No. 18/612,977, filed Mar. 21, 2024.
U.S. Appl. No. 18/218,381, filed Jul. 5, 2023.
U.S. Appl. No. 18/233,218, filed Aug. 11, 2023.
U.S. Appl. No. 18/614,482, filed Mar. 22, 2024.
U.S. Appl. No. 18/638,430, filed Apr. 17, 2024.
U.S. Appl. No. 18/404,795, filed Jan. 4, 2024.
Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.
Officeonthego.com, 3 pages of product description of Magnifico® PLUS screen magnifier product information retrieved from web site at: www.officeonthego.com.
2 pages of product information for Armor 1600 and Armor 1601 waterproof, dustproof and airtight protective cases.
2 pages OTTEROX 4600 Tablet PC Case protective cases product information retrieved from web site at: www.otterbox.com.
Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].
Battery Charging Specification (Including errata and ECNs through Mar. 15, 2012); Revision 1.2, Mar. 15, 2012. 72 pages.

* cited by examiner

CONTROL MECHANISM FOR USE WITH A MOBILE DEVICE DOCK AND SYSTEMS AND METHODS INCLUDING THE CONTROL MECHANISM

FIELD

The present invention is directed to a control mechanism for a vehicle, device, or asset that utilizes a dock for a mobile device. The present invention is also directed to a system that includes a control mechanism for a vehicle, device, or asset and a dock for a mobile device.

BACKGROUND

Some vehicles, devices, or assets (for example, electric lifts) have replaced an operation key (for example, an ignition key) with a simple switch, such as a start button. For safety or regulatory compliance, it is often useful or necessary to have a control mechanism in place so that only trained or authorized individuals (for example, a trained machine operator) can operate the vehicle or other device. Untrained or unauthorized use of the vehicle or device can put the operator or others at risk or may result in damage to goods, property, other objects, or the vehicle/device/asset itself. Such control mechanisms may be useful in a variety of other circumstances and for a variety of other vehicles, devices, or assets.

BRIEF SUMMARY

One embodiment is a control system for a vehicle, device, or asset. The control system includes a dock for a mobile device; and a control mechanism coupled, or coupleable to, the dock and including a power input, a dock input, and a first output, wherein the control mechanism defines an second switch position and a first switch position, wherein the switching mechanism is in the first switch position when a power source is coupled to the power input and an enablement signal is received from the dock via the dock input, otherwise the switching mechanism is in the second switch position, wherein the first output is coupleable to the vehicle, device, or asset to allow operation of the vehicle, device, or asset only when the switching mechanism is in the first switch position.

In at least some embodiments, the control system further includes the vehicle, device, or asset coupled to the control mechanism. In at least some embodiments, the control mechanism includes a relay. In at least some embodiments, the relay includes a plurality of pins, wherein the plurality of pins include a power input pin for the power input, a dock input pin for the dock input, a common pin, and a first output pin for the first output. In at least some embodiments, the plurality of pins further includes a second output pin for a second output.

In at least some embodiments, the control system further includes an operation switch coupled to the first output, wherein the operation switch permits operation of the vehicle, device, or asset only when the switching mechanism of the control mechanism is in the first switch position. In at least some embodiments, the control mechanism includes a second output, wherein the control mechanism is configured to prevent operation of the vehicle, device, or asset when the switching mechanism of the control mechanism is in the second switch position. In at least some embodiments, the control system further includes a safety disablement mechanism coupled to the second output to prevent operation of the vehicle, device, or asset when the switching mechanism of the control mechanism is in the second switch position.

In at least some embodiments, the control system further includes a power source coupled, or coupleable to, the power input of the control mechanism. In at least some embodiments, the control system further includes the vehicle, device, or asset coupled to the control mechanism, wherein the power source is part of the vehicle, device, or asset.

In at least some embodiments, the control system further includes a mobile device received, or receivable, by the dock. In at least some embodiments, the mobile device is configured to receive input from a user to direct the mobile device to deliver the enablement signal through the dock to the control mechanism. In at least some embodiments, the mobile device is configured to receive input from a user to halt directing the enablement signal through the dock to the control mechanism. In at least some embodiments, the mobile device is configured to require credentials or authorization of the user before delivering the enablement signal. In at least some embodiments, the mobile device is configured to receive input from a user to send a disengagement signal through the dock to the control mechanism.

Another embodiment is a method of controlling operation of a vehicle, device, or asset using any of the control systems described above. The method includes providing the control mechanism coupled to the vehicle, device, or asset and coupled to the dock; and providing an enablement signal to the control mechanism via the dock to permit operation of the vehicle, device, or asset.

In at least some embodiments, the method further includes preventing operation of the vehicle, device, or asset until the enablement signal is provided to the control mechanism via the dock. In at least some embodiments, the method further includes halting operation of the vehicle, device, or assert when the enablement signal is halted.

In at least some embodiments, providing the enablement signal includes receiving user input to a mobile device received by the dock to direct the mobile device to deliver the enablement signal through the dock to the control mechanism. In at least some embodiments, receiving user input includes receiving credentials or authorization of the user by the mobile device before the mobile device delivers the enablement signal.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to a control mechanism for a vehicle, device, or asset that utilizes a dock for a mobile device. The present invention is also directed to a system that includes a control mechanism for a vehicle, device, or asset and a dock for a mobile device.

Mobile devices, such as smartphones, cellular or mobile phones, tablets, personal data assistants, laptop computers, and other portable devices, are now ubiquitous. A mobile device can be used to enable or disable operation of a vehicle, device, or asset. A dock for the mobile device can be used to couple the mobile device to a control mechanism for the vehicle, device, or asset. In at least some embodiments, a dock (including docking stations or cradles) can also be used to charge the mobile device or to mount the mobile device onto a surface or object.

Figure 1:
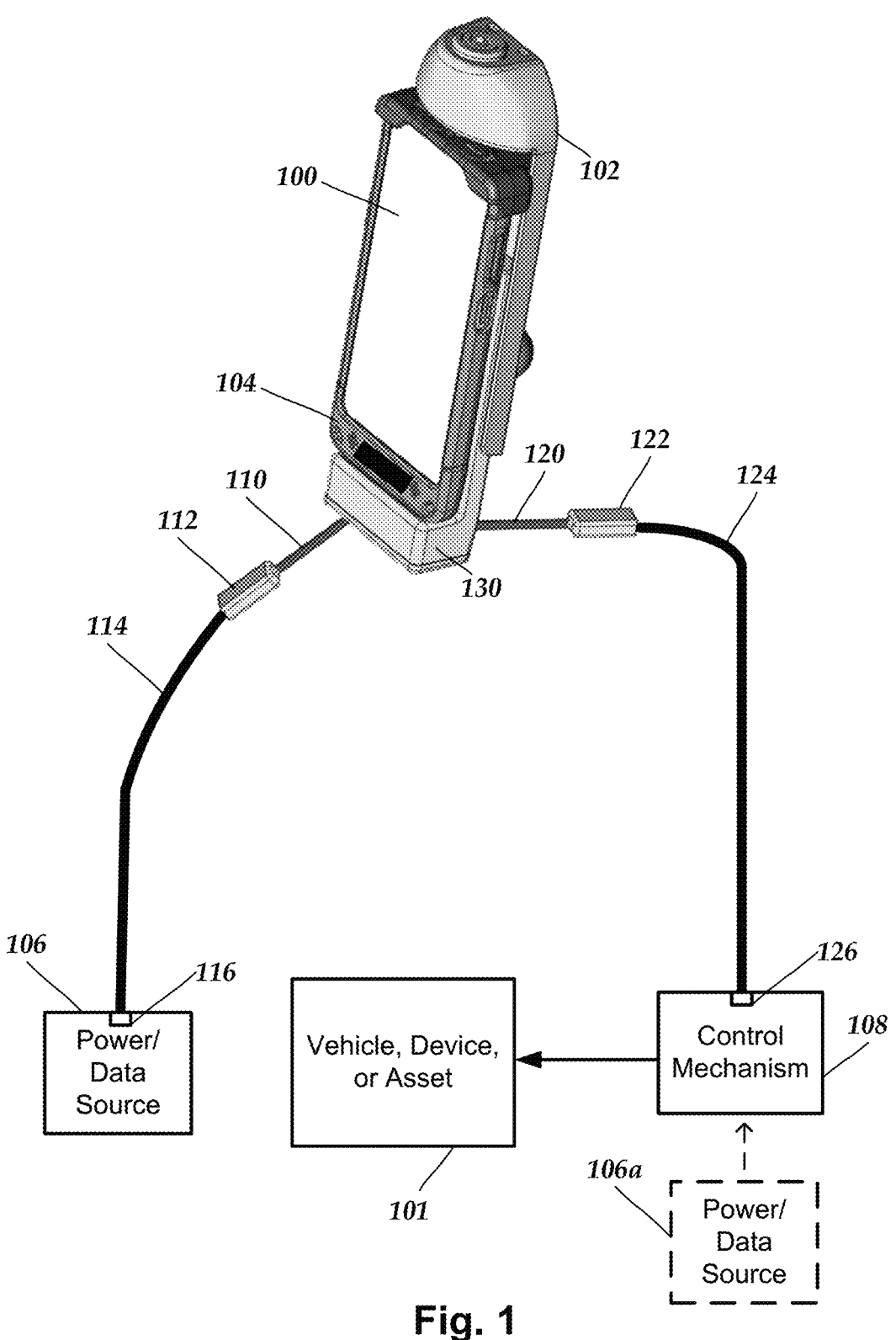
FIG. 1 is a schematic perspective view of one embodiment of system including a control mechanism, a dock, and a mobile device, according to the invention.

FIG. 1 illustrates one embodiment of a dock 102 (such as a cradle, docking station, or any other suitable dock), a mobile device 100 that is removably received by the dock, an optional power/data source 106 which can provide power or data (or both) to the mobile device via the dock, and a control mechanism 108. The control mechanism 108 is part of, or coupled to, a vehicle, device, or asset 101. In at least some embodiments, the control mechanism 108 may also be coupled to an optional power/data source 106*a* to provide the power or data (or both) to the mobile device via the control mechanism and the dock. In some embodiments, the optional power/data source 106*a* and control mechanism 108 are alternatively attachable to the dock 102. The power/data source 106, 106*a* can be a power source, a data source, or both a power source and a data source.

In at least some embodiments, the dock 102 is coupled, or coupleable, to the control mechanism 108 using a first dock cable 120, a first dock connector 122, a control mechanism cable 124, and a control mechanism connector 126. It will be recognized that one or more of these cables or connectors are optional. For example, there may be one or two cables and zero (e.g., the dock 102 is hardwired to the control mechanism 108), one (e.g., a cable is hardwired to either the dock 102 or the control mechanism 108), or two of the connectors.

In at least some embodiments, the first dock cable 120, first dock connector 122, control mechanism cable 124, and the control mechanism connector 126 (or any combination thereof) alternatively can be used to couple to a power/data source 106*a* to provide the power or data (or both) to the mobile device via the dock 102. For example, the dock 102 can be coupled to either the control mechanism 108 or the power/data source 106*a* using any combination of the first dock cable 120, first dock connector 122, control mechanism cable 124, and the control mechanism connector 126.

In at least some embodiments, the dock 102 is coupled, or coupleable, to the optional power/data source 106 using, for example, a second dock cable 110, a second dock connector 112, a power/data cable 114, and a power/data connector 116. It will be recognized that one or more of these cables or connectors are optional. For example, there may be one or two cables and zero (e.g., the dock 102 is hardwired to the power/data source 106), one (e.g., a cable is hardwired to either the dock 102 or the power/data source 106), or two of the connectors.

In at least some embodiments, the first dock connector 122, the second dock connector 112, the power/data connector 116, and the control mechanism connector 126 can be any suitable type of connector including, but not limited to, any type of USB connector, a set of contacts (for example, round contacts, pins, pogo pins, or the like), a Lightning connector, a Deutsch connector, an HSD connector, any other suitable proprietary or non-proprietary connector, or the like.

The power source (of a power/data source 106, 106*a*) can be, for example, a battery or other power source of the vehicle, device, or asset; a power outlet (for example, any suitable power outlet such as found in buildings, vehicles, or elsewhere); or the like or any other suitable power source. The data source (of a power/data source 106, 106*a*) can be a computer, a vehicle (for example, a computer or processor in the vehicle), a DVR (digital video recorder), a gateway, a hub, a router, a server, or the like or any other suitable data source.

The mobile device 100 can be any suitable mobile device including, but not limited to, a smartphone, cellular or mobile phone, tablet, personal data assistant, laptop computer, or the like. In at least some embodiments, the mobile device 100 has a USB 3.1 or USB Type C connector or any other suitable connector for coupling to external devices, such as the dock 102.

Figure 2A:
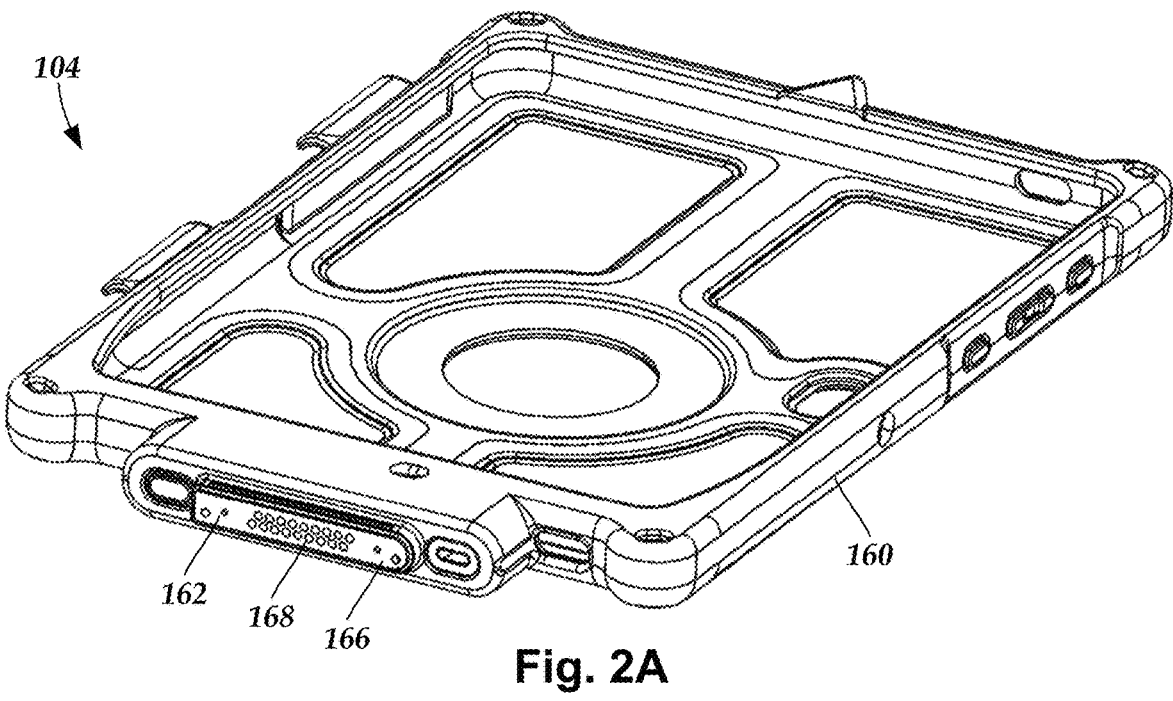
FIG. 2A is a schematic perspective view of one embodiment of a cover for a mobile device.
Figure 2B:
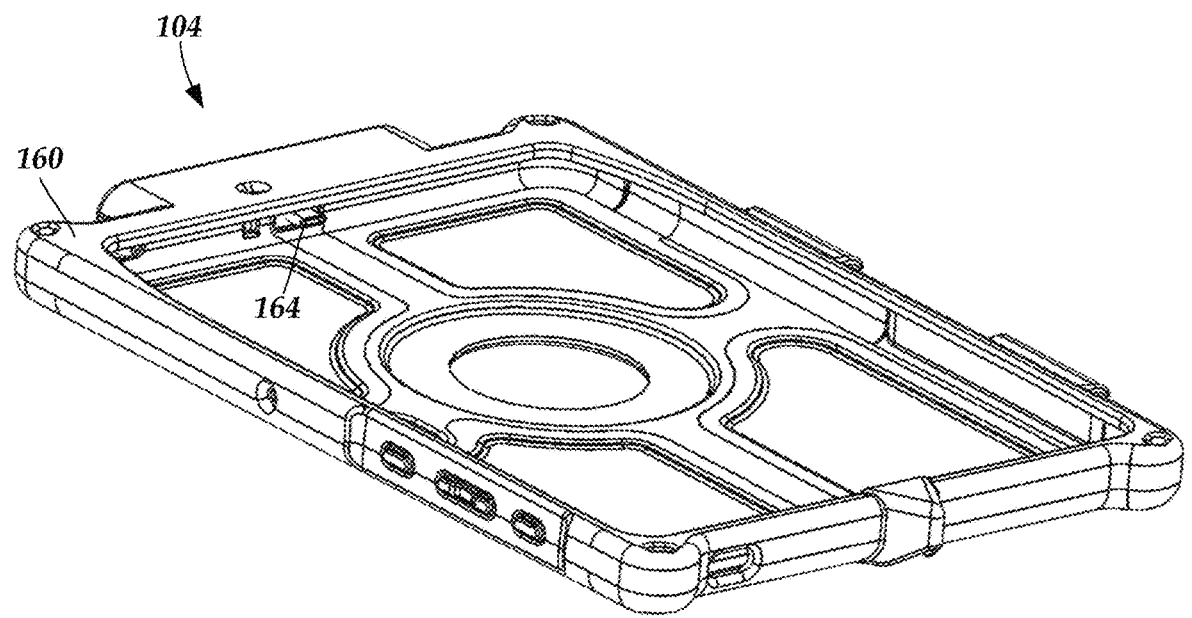
FIG. 2B is schematic perspective view of the cover of FIG. 2B from a different angle.

In at least some other embodiments, the mobile device 100 is disposed, or disposable, in a cover 104 with a flexible shell 160 for receiving and holding the mobile device. One embodiment of a cover 104 is illustrated in FIGS. 2A and 2B. In at least some embodiments, the cover 104 includes an adapter 162 that has a connector 164 (FIG. 2B) of a type compatible with the connector of the mobile device for coupling the adapter to contacts 133 (FIG. 3B) of the mobile device. The adapter 162 also includes a contactor 166 with contacts 168 for coupling to the dock 102, as described below. Examples of covers 104 for a mobile device 106 are described in U.S. Pat. Nos. 9,195,279; 9,331,444; 9,529,387; 9,602,639; 9,632,535; 9,706,026; 10,389,399; 10,050,658; 10,054,984; 10,454,515; 10,630,334; 10,666,309; 10,778,275 10,812,643; 11,029,731; 11,076,032; 11,165,458; 11,277,506; and 11,289,864 and U.S. Patent Applications Publication Nos. 2021/0391678 and 2021/0392773, all of which are incorporated herein by reference in their entireties. It will be understood that covers without an adapter can also be used.

Any suitable dock can be used or adapted for use with a mobile device 100 and a control mechanism 108. Examples of docks 102 for a mobile device 100 that can be adapted for use with a control mechanism 108 as presented herein are described in U.S. Pat. Nos. 7,017,243; 9,602,639; 9,831,904; 10,812,643; 11,029,731; 11,076,032; 11,277,506; and 11,289,864 and U.S. Patent Applications Publication Nos. 2021/0194256; 2021/0391678; and 2021/0392773, all of which are incorporated herein by reference in their entireties.

Figures 3A, 3B:
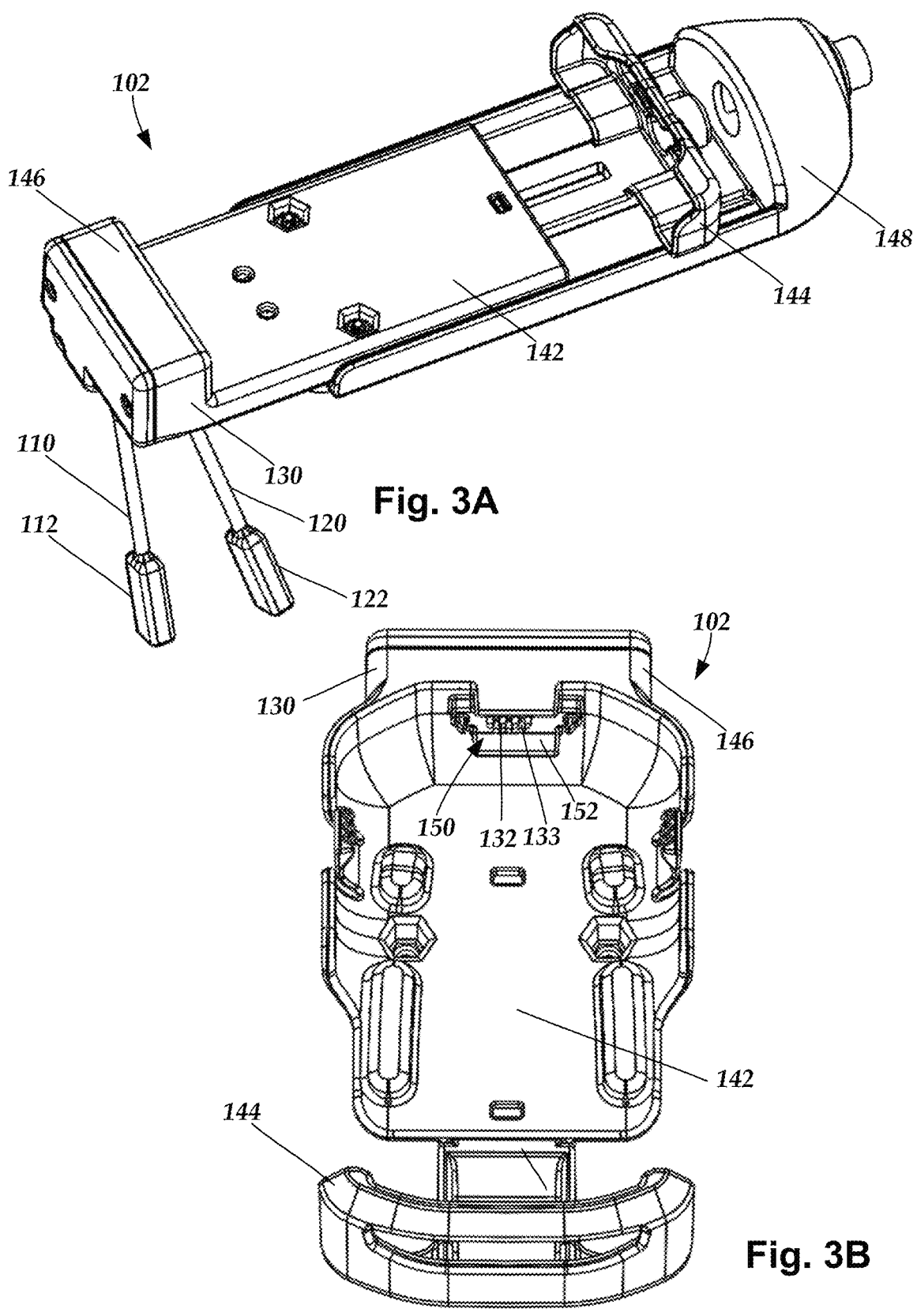
FIG. 3A is a schematic perspective view of one embodiment of a dock, according to the invention.
FIG. 3B is a schematic perspective view of another embodiment of a dock, according to the invention.

FIGS. 3A and 3B illustrate two embodiments of a dock 102. In at least some embodiments, the dock 102 includes a base 142, a top device receiver 144 for receiving a top portion of the mobile device, a bottom device receiver 146 coupled to the cradle base 142, a housing 130, and a mobile device connector 132 that includes contacts 133. Other docks 102 can include more or fewer components than the embodiments illustrated in FIGS. 3A and 3B.

The contacts 133 are coupled to the first dock cable 120, first dock connector 122, second dock cable 110, and second dock connector 112 and, via these cables and connectors, to the power/data source 106, 106*a* and control mechanism 108. The contacts 133 are coupled, or coupleable, to contacts on the mobile device 100 or cover 104 of the mobile device so that operation signals can be transmitted to the control mechanism 108 to enable or disable the vehicle, device, or asset 101. In at least some embodiments, the contacts 133 can also be used to provide power to the mobile device from a power source or transmit data between the mobile device and a data source.

In at least some embodiments, the top device receiver 144 is movable (for example, slidable) relative to the base 142 to facilitate receiving or removing the mobile device and, in at least some embodiments, may also allow for use with mobile devices of varied sizes. In at least some embodiments, the top device receiver 144 is biased toward the base 142 (using, for example, a spring or the like) to hold the mobile device in the dock 102. In at least some embodiments, the bottom device receiver 146 includes a recess 150 defined by a rim 152, as illustrated in FIG. 3B.

In at least some embodiments such as the embodiment illustrated in FIG. 3A, the dock 102 includes a locking mechanism 148. In at least some embodiments, an optional mount is coupled or coupleable to the dock 102. Non-limiting examples of mounts can be found at U.S. Pat. Nos. 5,845,885; 6,561,476; 7,320,50; 7,997,554; 8,454,178; 8,505,861; 9,831,904; RE42,060; RE42,581; and RE43,806, all of which are incorporated herein by reference in their entireties.

Figures 4A, 4B:
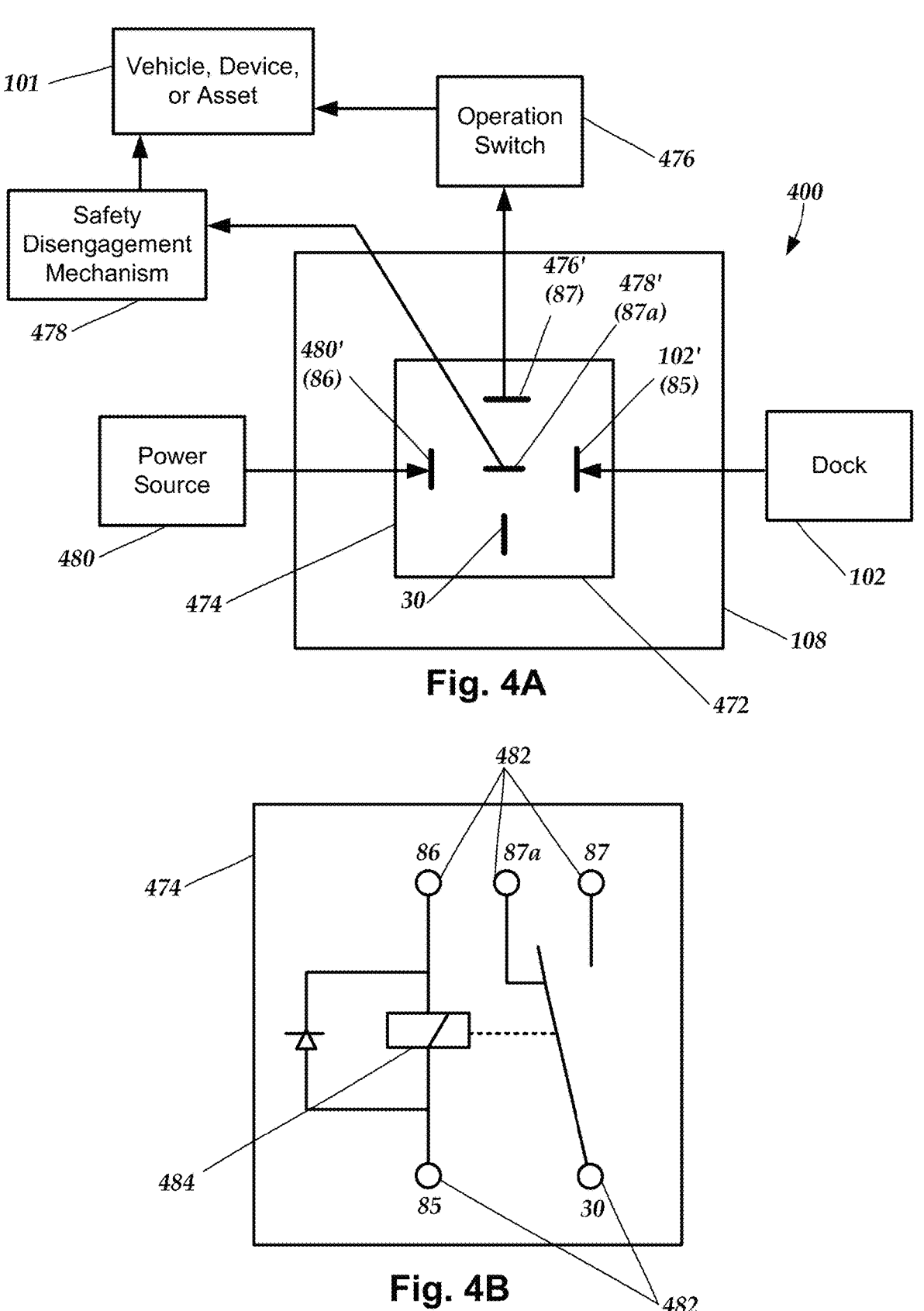
FIG. 4A is a schematic block diagram of one embodiment of a system that includes a control mechanism, dock, operation switch, safety disablement mechanism, and power source, according to the invention.
FIG. 4B is a schematic pin diagram of a relay of a control mechanism, according to the invention.

FIGS. 4A and 4B illustrate one embodiment of a system 400 with a control mechanism 108 that includes a switching mechanism 472, such as a relay 474. The system 400 includes multiple input or output devices coupled to the switching mechanism 472 of the control mechanism 108. In at least some embodiments, the dock 102 is coupled to a dock input 102', an operation switch 476 (for example, an ignition or on/off switch of a vehicle, device, or asset 101) is coupled to a first output 476', an optional safety disablement mechanism 478 (or any other arrangement that prevents operation of the vehicle, device, or asset 101) is coupled to a second output 478', and a power source 480 is coupled to a power input 480'.

In at least some embodiments, the power source 480 is the battery or other power source of the vehicle, device, or asset 101; a battery in, or attached to, the control mechanism 108; a battery of the mobile device 100 or attached to the dock 102; a power outlet (for example, any suitable power outlet such as found in buildings, vehicles, or elsewhere); the power/data source 106, 106*a*; or the like or any other suitable power source. In at least some embodiments, the operation switch 476 is a button, flip switch, key-operated switch, or any other suitable switching mechanism.

FIGS. 4A and 4B illustrates one embodiment of relay 474 that includes a coil 484. It will be understood that other relays (for example, 4-pin relays) or other switching mechanisms can be used in the control mechanism 108. FIG. 4A illustrates an attachment arrangement of the multiple input or output devices to the pins 482 (or other attachment points) of the relay 474 and FIG. 4B illustrates a simplified operational diagram of the relay 474. In the illustrated embodiment, the pins 482 of the relay 474 include a common pin 30 (for example, a pin attached to a ground or other reference), a first coil pin 85 (e.g., a dock input 102'), a second coil pin 86 (e.g., a power input 480'), a normally open pin 87 (e.g., first output 476'), and a normally closed pin 87*a* (e.g., second output 478'). In the illustrated embodiment, the first coil pin 85 is coupled to the dock 102, the second coil pin 86 is coupled to the power source 480, the normally open pin 87 is coupled to the operation switch 476, and the normally closed pin 87*a* is coupled to the safety disablement mechanism 478. Any other suitable assignment of the pins can be used.

In the illustrated embodiment, the relay 474 is normally closed. In operation, the control mechanism 108 prevents operation of a vehicle, device, or asset 101 until i) the power source 480 is coupled to the control mechanism and ii) the mobile device 100 or dock 102 sends an enablement signal to the control mechanism 108. In at least some embodiments, the control mechanism 108 provides a first switch signal to the operation switch 476 when i) the power source 480 is coupled to the control mechanism and ii) the mobile device 100 or dock 102 sends an enablement signal to the control mechanism 108. In at least some embodiments, the enablement signal energizes the coil 484 of the relay 474 (or directs any other arrangement for operating a switching mechanism 472) to cause the relay to switch from the normally closed pin 87*a* and safety disablement mechanism 478 to the normally open pin 87 and operation switch 476. The operation switch 476 will not start (or initiate operation of) the vehicle, device, or asset 101 unless the mobile device 100 or dock 102 has first sent an enablement signal to energize the coil 484 and the power source 480 is coupled to the control mechanism 108.

In at least some embodiments, the control mechanism 108 provides a first switch signal to the operation switch 476 when i) the power source 480 is coupled to the control mechanism and ii) the mobile device 100 or dock 102 sends an enablement signal to the control mechanism 108. In at least some embodiments, the control mechanism 108 provides a second switch signal to the safety disablement mechanism 478 otherwise.

For example, a user must first use the mobile device 100 or dock 102 to send an enablement signal to the control mechanism 108 before the operation switch 476 is operable to start, or enable operation of, the vehicle, device, or asset 101. This can prevent, or reduce the likelihood, that the vehicle, device, or asset 101 will start or otherwise operate due to inadvertent or unauthorized use of the operation switch 476. In at least some embodiments, a disengagement signal can be sent from the mobile device 100 or dock 102 to de-energize the coil 484 and halt operation of the vehicle, device, or asset 101.

In at least some embodiments, the mobile device 100 includes software, such as an application, that allows the user to direct engagement or, optionally, disengagement of the control mechanism 108. The software, upon input from the user, sends an engagement (or, optionally, disengagement) signal to the control mechanism 108 to energize (or de-energize) the coil 484 of the relay 474 (or direct any other arrangement for operating a switching mechanism 472). The signal can be, for example, a digital signal or value, an analog signal or value, or the like or any combination thereof. In at least some embodiments, the dock 102 includes a switch (for example, a button, flip switch, or the like) that, upon operation, sends an engagement (or, optionally, disengagement) signal to the control mechanism to energize (or de-energize) the coil 484 of the relay 474 (or direct any other arrangement for operating a switching mechanism 472).

In at least some embodiments, the software can require credentials or authorization to allow the user to send the signals to the control mechanism 108. Such credentials or authorization can include, but are not limited to, an identification card, a password, an RFID (radio frequency identification) or NFC (near field communication) tag, or the like or any combination thereof.

In at least some embodiments, the software can have additional functionality including, but not limited to, recording vehicle, device, or asset usage; recording user identification or information; monitoring usage time; providing other metrics regarding the vehicle, device, or asset or usage of the vehicle, device, or asset; providing location information (for example, GPS data), providing an indication of operation position (for example, seated or not seated); or the like or any combination thereof.

Figure 4C:
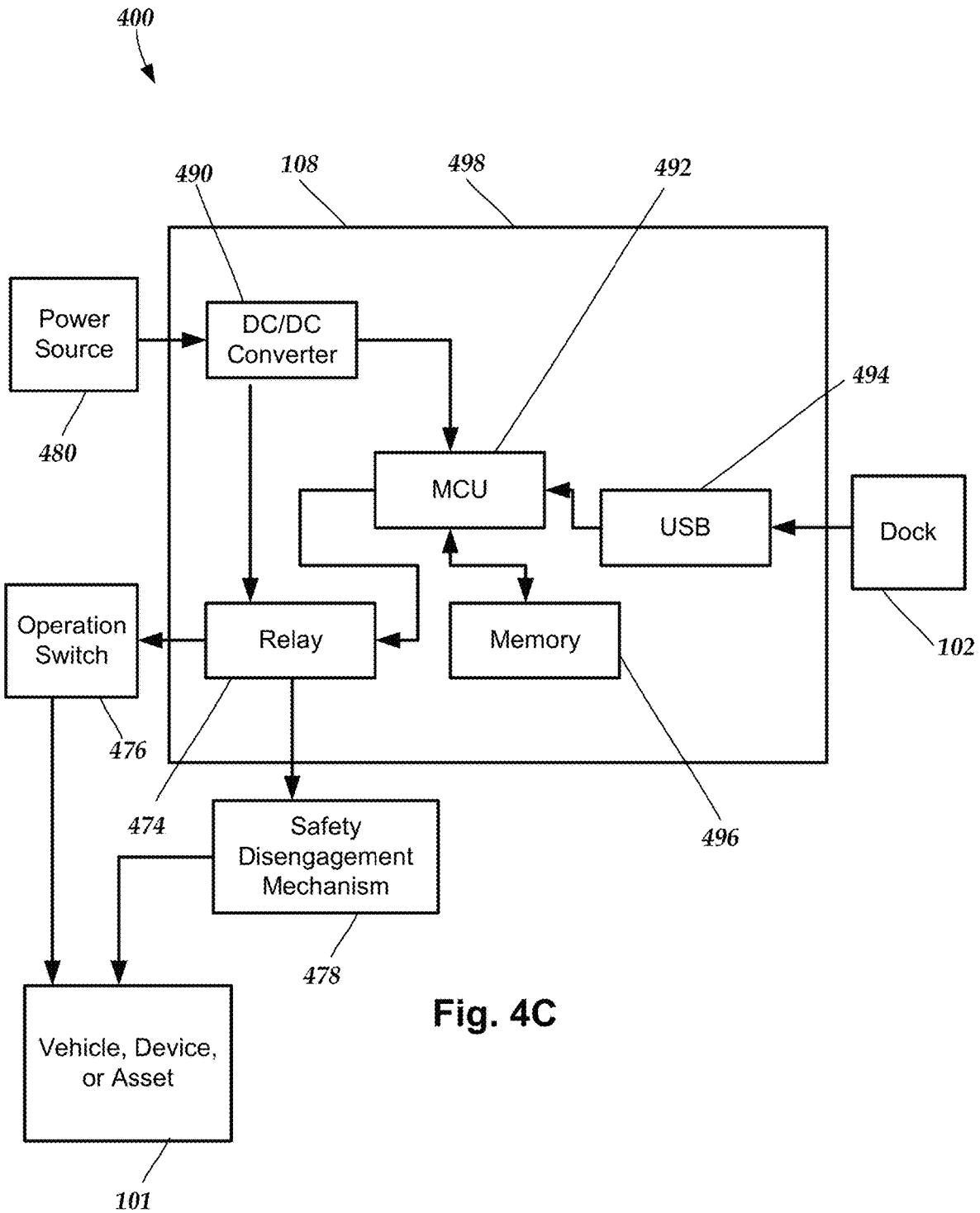
FIG. 4C is a schematic block diagram of another embodiment of a system that includes a control mechanism, dock, operation switch, safety disablement mechanism, and power source, according to the invention.

FIG. 4C illustrates one embodiment of additional components of the control mechanism of FIGS. 4A and 4B. The illustrated control mechanism 108 includes a DC/DC controller 490, a microcontroller unit (MCU) 492, a USB interface 494, and an optional memory 496. In at least some embodiments, the control mechanism 108 includes a housing 498 to house some or all of the components. It will be understood that other embodiments of the control mechanism 108 can include fewer, more, or different components.

The DC/DC converter 490 (or other converter) receives power from a power source 480 such as, for example, from the vehicle through a vehicular DC outlet coupled to the vehicle's battery or power system. Other power sources 480 can be used as described above. In at least some embodiments, the control mechanism 108 includes a cord for coupling to the power source 480. In other embodiments, the control mechanism 108 includes a connector for receiving a connector of a cord for coupling to the power source 480. In at least some embodiments, the DC/DC converter 490 is a buck converter or step-down converter to step-down the voltage from the power source 480. Other converters can be used. The DC/DC converter 490 provides power for the control mechanism 108 and my provide power for charging or operation of the mobile device 100. In at least some embodiments, the control mechanism 108 may also be capable of receiving power from the mobile device 100 when, for example, the vehicle, device, or asset 101 is not operating.

The relay 474 (or other switching mechanism) is coupled, or coupleable, to the operation switch 476 of a vehicle, device, or asset 101. In at least some embodiments, the relay 474 (or other switching mechanism) is coupled, or coupleable, to an optional safety disablement mechanism 478 of a vehicle, device, or asset 101. In at least some embodiments, the control mechanism 108 includes one or more cords for coupling to the operation switch 476 or the optional safety disablement mechanism 478 or both. In other embodiments, the control mechanism 108 includes one or more connectors for receiving a connector of a cord for coupling to the operation switch 476 or the optional safety disablement mechanism 478 or both.

The USB interface 494 is coupled, or coupleable, to the dock 102 and, through the dock, to the mobile device 100. Although a USB interface 494 is exemplified herein, it will be understood that any other suitable interface or connectors can be used between the control mechanism 108 and the dock 102.

The MCU 492 can include, or be, a microprocessor and can control operation of the other components of the control mechanism 108. In at least some embodiments, the MCU 492 may also provide random access memory (RAM) for the control mechanism 108. The memory 496 can be any suitable memory device including, but not limited to, RAM, ROM, EEPROM, flash memory, or other memory technology. In at least some embodiments, the memory 496 can be used to store instructions for operation of the control mechanism 108 and may include instructions that can be downloaded to the mobile device 100, such as instructions for the software or other application to allow user input to enable or disable the control mechanism 108.

The above specification and examples provide a description of the arrangement and use of the invention. Since many embodiments of the invention can be made without departing from the spirit and scope of the invention, the invention also resides in the claims hereinafter appended.

What is claimed as new and desired to be protected is:

1. A control system for a vehicle, comprising:
   a dock for removably receiving a mobile device; and
   a control mechanism coupled, or coupleable to, the dock and comprising a power input, a dock input, and a first output, wherein the control mechanism defines a first switch position and a second switch position, wherein the control mechanism is in the first switch position when a power source is coupled to the power input and an enablement signal is received, via the dock input, from the mobile device physically received by the dock, otherwise the control mechanism is in the second switch position, wherein the first output is configured to couple to the vehicle to operate the vehicle only when the control mechanism is in the first switch position.

2. The control system of claim 1, wherein the control mechanism comprises a relay.

3. The control system of claim 1, further comprising the vehicle coupled to the control mechanism.

4. A control system for a vehicle, device, or asset, comprising:
   a dock for a mobile device; and
   a control mechanism coupled, or coupleable to, the dock and comprising a power input, a dock input, a first output, and a relay, wherein the control mechanism defines a first switch position and a second switch position, wherein the control mechanism is in the first switch position when a power source is coupled to the power input and an enablement signal is received from the mobile device via the dock input, otherwise the control mechanism is in the second switch position, wherein the first output is coupleable to the vehicle, device, or asset to allow operation of the vehicle, device, or asset only when the control mechanism is in the first switch position, wherein the relay comprises a plurality of pins, wherein the plurality of pins comprise a power input pin for the power input, a dock input pin for the dock input, a common pin, and a first output pin for the first output.

5. The control system of claim 4, wherein the plurality of pins further comprises a second output pin for a second output.

6. The control system of claim 4, further comprising an operation switch coupled to the first output, wherein the operation switch permits operation of the vehicle, device, or asset only when the control mechanism is in the first switch position.

7. The control system of claim 6, wherein the control mechanism comprises a second output, wherein the control mechanism is configured to prevent operation of the vehicle, device, or asset when the control mechanism is in the second switch position.

8. The control system of claim 7, further comprising a safety disablement mechanism coupled to the second output to prevent operation of the vehicle, device, or asset when the control mechanism is in the second switch position.

9. The control system of claim 4, further comprising a power source coupled, or coupleable to, the power input of the control mechanism.

10. The control system of claim 9, further comprising the vehicle, device, or asset coupled to the control mechanism, wherein the power source is part of the vehicle, device, or asset.

11. The control system of claim 4, further comprising the mobile device received, or receivable, by the dock.

12. The control system of claim 11, wherein the mobile device is configured to receive input from a user to direct the mobile device to deliver the enablement signal through the dock to the control mechanism.

13. The control system of claim 12, wherein the mobile device is configured to receive input from a user to halt directing the enablement signal through the dock to the control mechanism.

14. The control system of claim 12, wherein the mobile device is configured to require credentials or authorization of the user before delivering the enablement signal.

15. The control system of claim 11, wherein the mobile device is configured to receive input from a user to send a disengagement signal through the dock to the control mechanism.

16. A method of controlling operation of a vehicle, device, or asset using the control system of claim 4, the method comprising:

providing the control mechanism coupled to the vehicle, device, or asset and coupled to the dock; and providing an enablement signal to the control mechanism via the dock to permit operation of the vehicle, device, or asset.

17. The method of claim 16, further comprising preventing operation of the vehicle, device, or asset until the enablement signal is provided to the control mechanism via the dock.

18. The method of claim 16, further comprising halting operation of the vehicle, device, or assert when the enablement signal is halted.

19. The method of claim 16, wherein providing the enablement signal comprises receiving user input to the mobile device received by the dock to direct the mobile device to deliver the enablement signal through the dock to the control mechanism.

20. The method of claim 19, wherein receiving user input comprises receiving credentials or authorization of a user by the mobile device before the mobile device delivers the enablement signal.

\* \* \* \* \*